Figure 5:
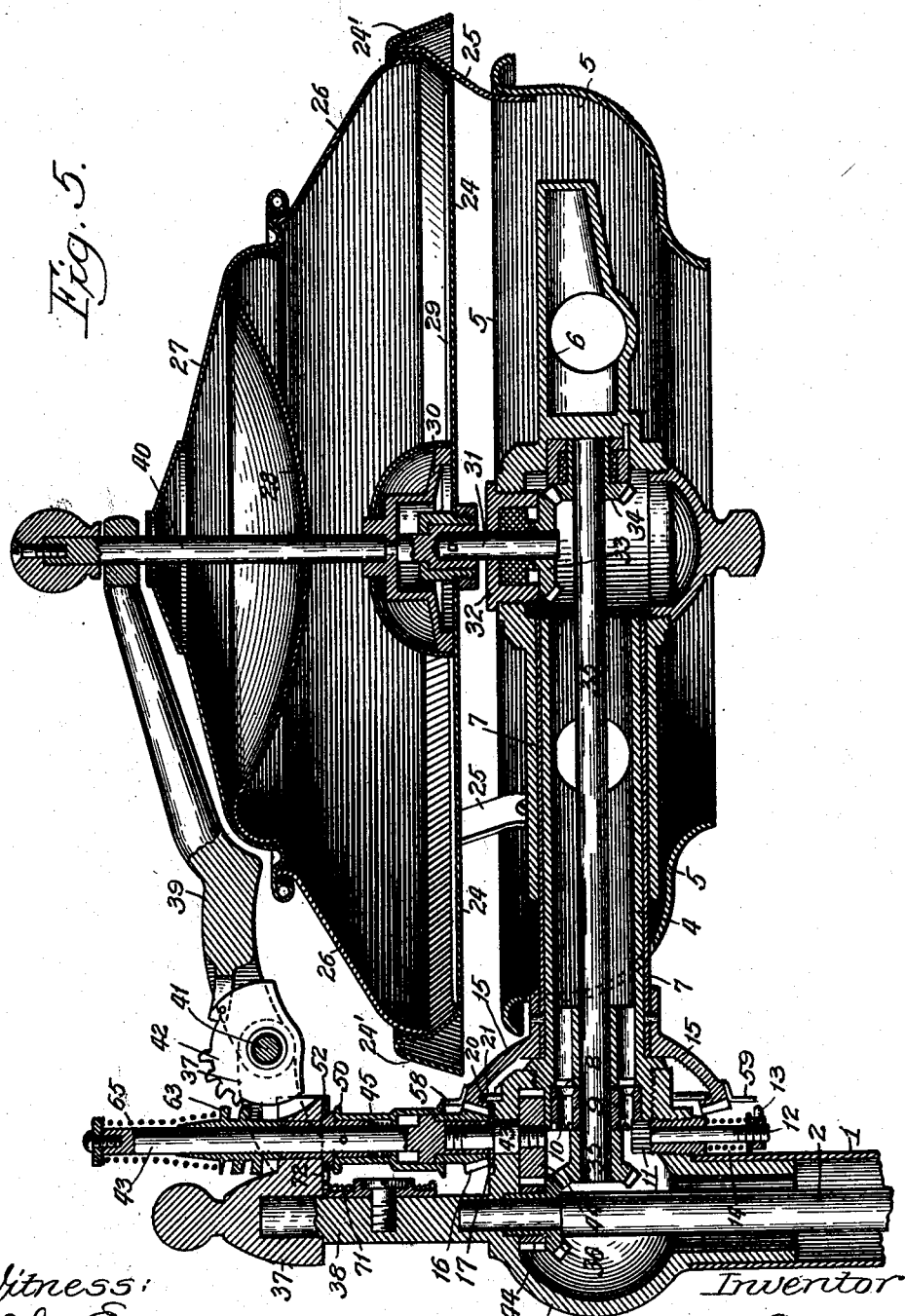

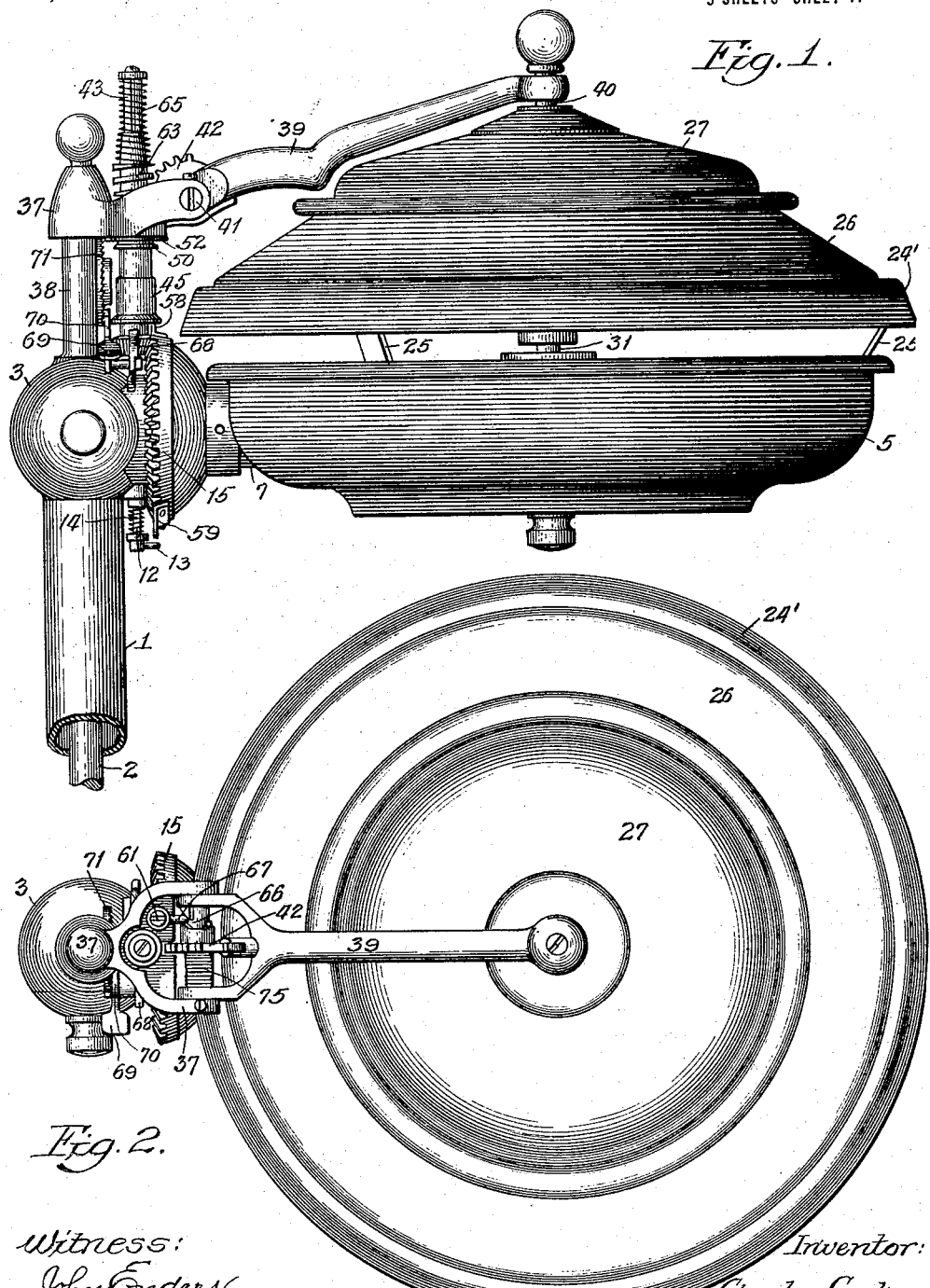

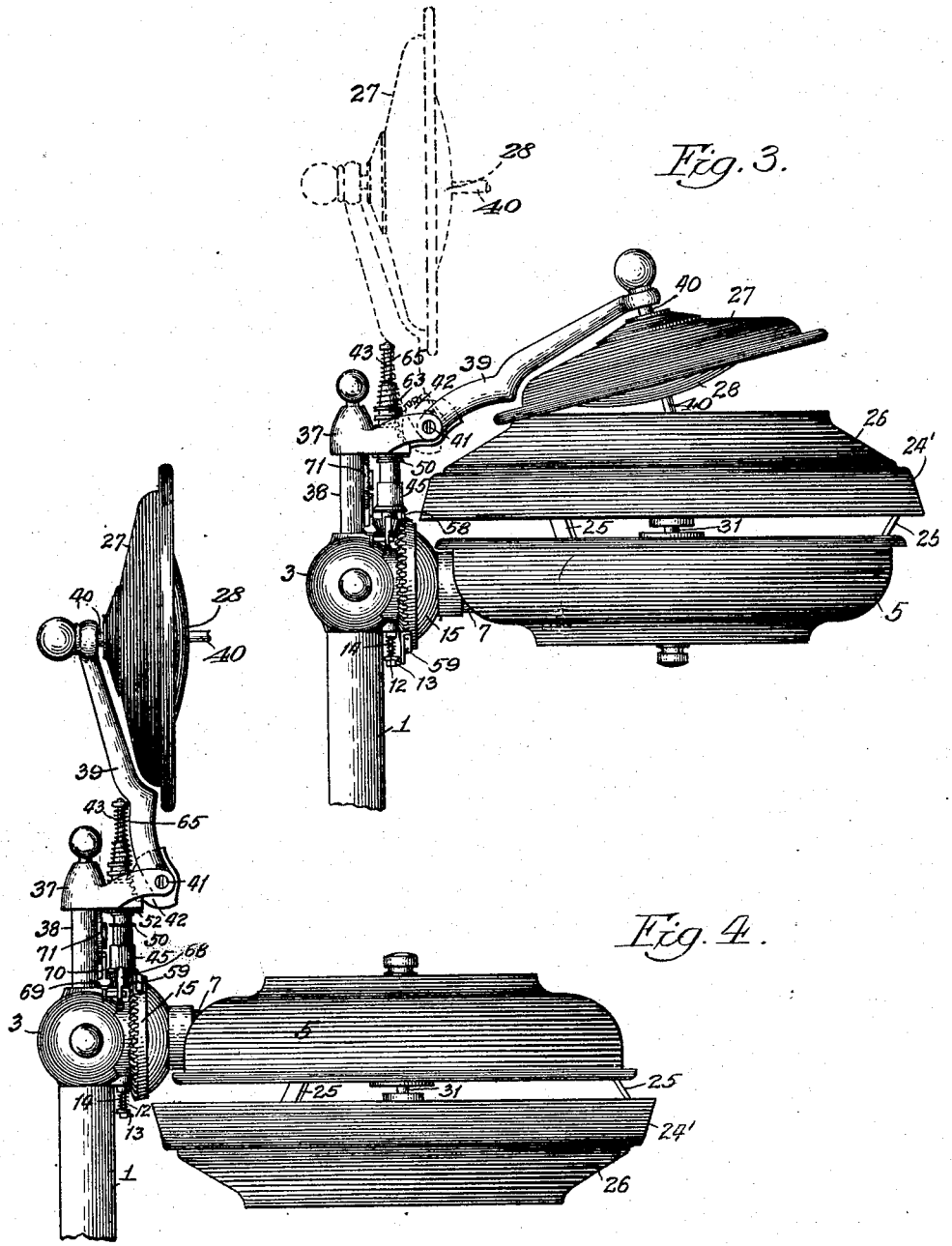

C. CRETORS.
CORN POPPING APPARATUS.
APPLICATION FILED AUG. 20, 1915.

1,201,807.

Patented Oct. 17, 1916.
5 SHEETS—SHEET 3.

Witness:
John Enders

Inventor:
Charles Cretors,
by Robert Burns,
Atty.

C. CRETORS.
CORN POPPING APPARATUS.
APPLICATION FILED AUG. 20, 1915.
1,201,807.
Patented Oct. 17, 1916.
5 SHEETS—SHEET 4.
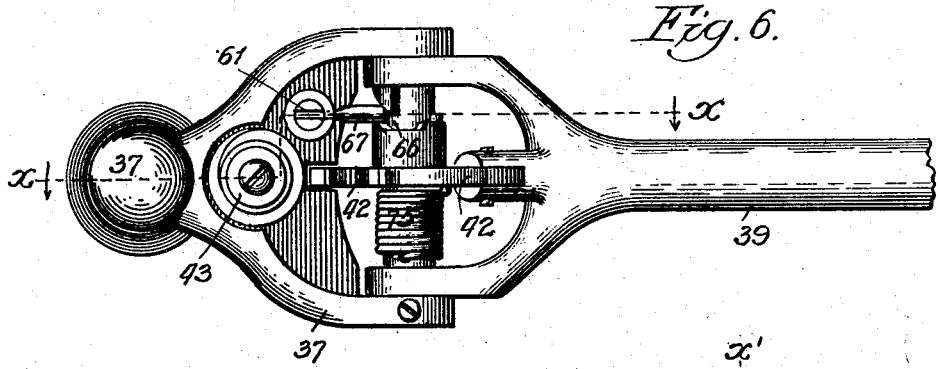
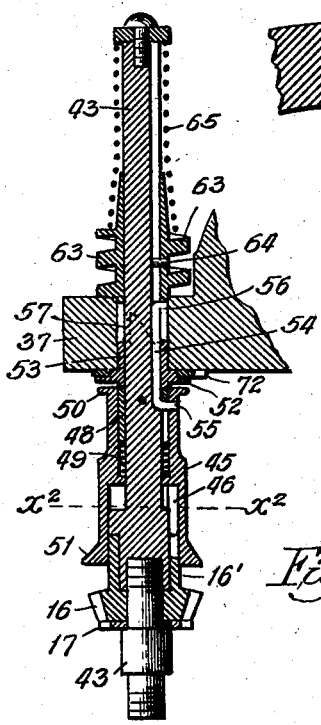
Witness:
John Enders
Inventor:
Charles Cretors,
by Robert Burns
Atty.

C. CRETORS.
CORN POPPING APPARATUS.
APPLICATION FILED AUG. 20, 1915.
1,201,807.
Patented Oct. 17, 1916.
5 SHEETS—SHEET 5.
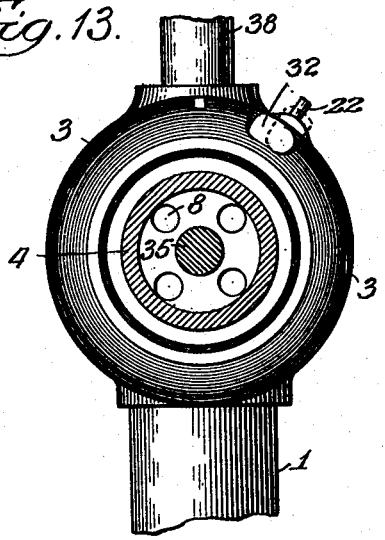
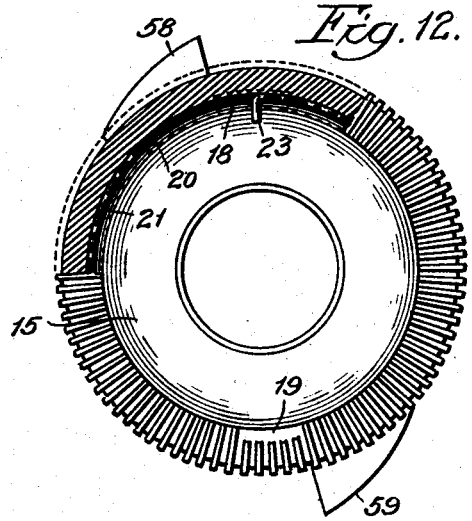
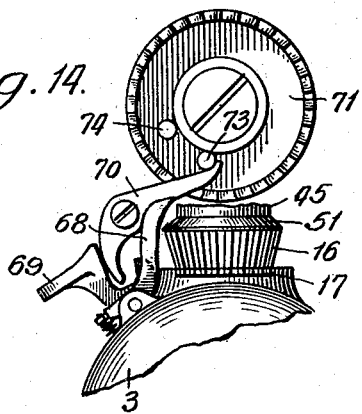
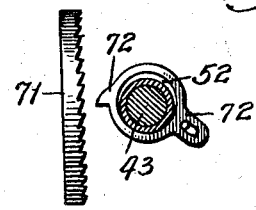
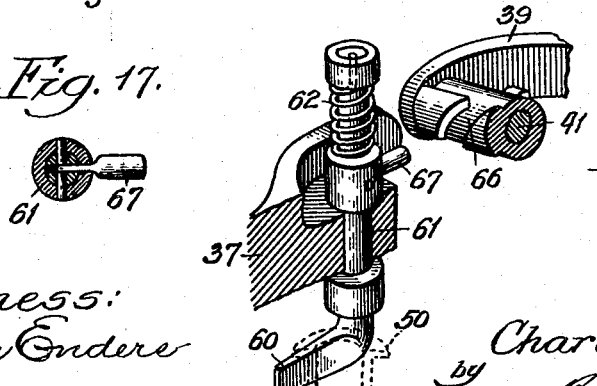
Witness:
John Endere
Inventor:
Charles Cretors,
by Robert Burns,
Atty.

UNITED STATES PATENT OFFICE.

CHARLES CRETORS, OF CHICAGO, ILLINOIS.

CORN-POPPING APPARATUS.

1,201,807. Specification of Letters Patent. Patented Oct. 17, 1916.

Application filed August 20, 1915. Serial No. 46,490.

*To all whom it may concern:*

Be it known that I, CHARLES CRETORS, a citizen of the United States of America, and a resident of Chicago, in the county of Cook and State of Illinois, have invented certain new and useful Improvements in Corn-Popping Apparatus, of which the following is a specification.

This invention relates to the pan type of corn popping apparatus an example of which forms the subject matter of my prior Patent No. 728,550, of May 17, 1903. And the present improvement has for its main object to provide a structural formation and association of parts whereby the different stages of the corn popping operation are serially controlled in an automatic manner and so that as the charge of raw corn in the popping chamber, under the influence of a proper heat, commences to pop the incidental swelling of the mass will effect a partial opening of the cover of the popping vessel or pan and an automatic operative engagement of said cover with the driving mechanism of the apparatus and an attainment of a fully opened position of said cover and a free and unimpeded escape of the popped corn during the further continued popping operation of the apparatus. The arrangement of the machanism is such that with the expiration of a predetermined period of time in such popping operation and during which the popping of the mass or charge of corn is effected, the popping pan or vessel is automatically brought into operative engagement with the driving mechanism of the apparatus and receives a semi-revolution therefrom so as to assume an inverted position in which it remains for a predetermined period of time to permit of the free discharge of the remaining contents of the popping pan or vessel. With the expiration of the last mentioned period of time the popping pan or vessel is again operatively engaged to receive a further semi-revolution, and assume its original position ready to receive a fresh charge of corn for a succeeding popping operation, all as will hereinafter more fully appear.

In the accompanying drawings:—Figure 1 is a side elevation of an automatic corn popping apparatus embodying the preferred form of the present invention. Fig. 2 is a top view of the same. Fig. 3, is a side elevation, showing the apparatus with the pan cover in its partly opened condition in full lines, and in its fully opened condition in dotted lines. Fig. 4, is a companion side view illustrating the popping pan and accessories in an inverted or discharging position. Fig. 5, is an enlarged central vertical section of the apparatus. Fig. 6, is an enlarged detail plan of the pivot connections, etc., of the pan cover. Fig. 7, is a detail vertical sectional elevation on line $x$—$x$, Fig. 6, illustrating the intermediate shaft and accessories, by which automatic opening movement is imparted to the pan cover, and also showing the primary holding means for the clutch sleeve of the mechanism, as well as the timing mechanism thereof. Fig. 8, is a detail vertical section on line $x'$—$x'$, Fig. 7. Fig. 9, is a perspective view of the aforesaid sectional shaft and its accessories, in a detached condition. Fig. 10, is a detail horizontal section on line $x^2$—$x^2$, Fig. 8. Fig. 11, is an elevation of a portion of the toothed rim of the bevel gear wheel of the associated popping pan and burner of the apparatus, and illustrating one of the mutilated portions of said rim. Fig. 12, is a detail elevation, partly in section, of the aforesaid bevel gear wheel and its accessories. Fig. 13, is a sectional elevation in a direction opposite to that in which Fig. 12 is taken, and illustrating the frame hub and accessories with which the aforesaid bevel gear wheel is associated. Fig. 14, is a detail elevation of the timing mechanism by which the intermittent semi-rotary movements of the popping pan and accessories are governed. Fig. 15, is a detail horizontal section on line $x^3$—$x^3$, Fig. 7, of operating eccentric, and ratchet disk and pawl portion of the timing mechanism aforesaid. Fig. 16, is a detached perspective view of the parts comprising the primary holding mechanism of the apparatus and which is actuated by the opening movement of the pan cover. Fig. 17, is a detail horizontal section illustrating the pivoted connection of the cam finger to the semi-rotary stem which carries the holding toe of the aforesaid primary holding mechanism.

Similar reference numerals indicate like parts in the several views.

Referring to the drawings, 1 designates a tubular column or post constituting the supporting means of the apparatus, with its bore adapted to provide a conduit for the fuel gas used as a heating means in the apparatus. Said bore also containing a vertically arranged primary driving shaft 2 which receives constant rotation from any suitable power source.

3 designates an enlarged hollow head forming the upper part of the column 1 and providing bearings for the upper end of the aforesaid shaft 2, and other rotatable parts hereinafter described, as well as a support for the stationary horizontal bracket tube 4, upon which the hereinafter described fuel gas burner and associated popping pan are revolubly mounted to turn in a vertical plane.

5 designates the annular inclosing shell of the fuel gas burner, and 6 designates the fuel gas burner which may be of any ordinary and suitable formation, and which in the present construction is provided with a horizontally disposed tubular member 7 adapted to fit and turn upon the stationary bracket tube 4 above described.

8 designates a stationary valve member arranged in the bore of the aforesaid tubular member 4 and near the outer end of the same as shown in Fig. 5.

9 designates a movable valve member associated with the aforesaid stationary valve member 8, and adapted in its adjustment to control the flow of fuel gas to the burner 6. In the construction shown, said movable valve member 9 is provided with a toothed rim 10 adapted for operative engagement with a pinion 11, the carrying shaft 12 of which extends down through a wall of the enlarged head 3 aforesaid, and has at its lower end a handle 13 for manual operation.

14 designates a friction spring associated with the aforesaid shaft 12 and the head 3, to frictionally retard the turning movement of the valve 8 in a manual operation of the same.

15 designates a cup-shaped bevel gear wheel secured to the outer end of the tubular member 7 of the burner 6, and adapted for operative engagement with the primary pinion 16, and the auxiliary pinion 17 hereinafter described. The portion of the bevel gear teeth of the wheel 15 that meshes with the primary pinion 16 are continuous of the circumference of said wheel, while the portion of the bevel gear teeth of said wheel 15 that meshes with the auxiliary pinion 17 have a mutilated form, and to such end are formed with diametrically opposed mutilations or gaps 18 and 19, as shown in Figs. 11 and 12, for the purpose hereinafter described in connection with the detailed description of the aforesaid pinions 16 and 17, and their operative connections.

20 designates an annular recess in the cavity of the bevel gear wheel 15, for the reception of a friction ring 21, and for engagement with a holding dog 22, hereinafter described.

21 designates the resilient friction ring above referred to, and which is provided with an inturned prong 23 having engagement in a peripheral recess in an adjacent hub portion of the column head 3, to hold said ring from a turning movement and so that the same will have frictional contact in the annular recess 20 aforesaid, to retard the turning movement of the bevel gear wheel 15 and its accessories.

22 designates the holding dog above referred to, the carrying shaft of which is journaled in the aforesaid hub portion of the column head 3, and pivotally supports the dog 22 in place, so that it can be turned outwardly to engage in the aforesaid annular recess of the bevel gear wheel 15, to prevent longitudinal disengagement of said bevel gear wheel and its associated parts from a normal operative position on the stationary bracket tube 4, before described.

24 designates the approximately flat bottom popping pan or vessel of the apparatus, which in the present structure is provided with a flaring marginal wall, which in turn ends in a down turned annular skirt 24' as illustrated in Fig. 5. The said skirt 24' is adapted to impart stiffness to the pan 24, as well as to retain the heated products of combustion in contact with the marginal portion of the popping pan 24.

25 designates marginally disposed bars constituting supporting connection between the popping pan 24 and the burner casing 5, as shown.

26 designates the top member or hood of the popping pan 24, of a truncated cone form, with its lower margin engaged within the flaring upturned margin of the pan 24, and with its contracted open upper end closed by the pan cover hereinafter described. The above described form of the top member 26, is adapted to retard the upward flow of the popping mass of corn and direct the same toward the pan cover above referred to, and effect a partial opening of the same. The construction is also adapted to prevent a premature spilling of the top portion of the mass of corn before the same has fully popped.

27 designates the pan cover above referred to, and which is provided with a central downturned convex web 28, adapted to direct the popped corn, as it expands, in a direction toward the margin of said cover to aid in the initial raising and opening of said cover during the practical operation of the apparatus. The cover 27 is pivotally connected to the supporting column 1, by means and in the manner hereinafter described in detail.

29 designate the stirrer blades, preferably formed of strips of resilient metal, as in my aforesaid Letters Patent No. 728,550, and carried by a centrally disposed hub member 30, which is journaled by a depending shaft 31 in the bottom web of the pan 24, as shown.

32 designates a stuffing box arranged in the top portion of an enlarged inner or central head of the tubular member 7 aforesaid, and through said stuffing box 32, the lower portion of the depending shaft 31 aforesaid, passes in a gas tight manner.

33 designates a bevel gear wheel secured to the lower end of the shaft 31 and within the chamber of the aforesaid head of the tubular member 7, as shown in Fig. 5.

34 designates a companion bevel gear wheel in operative engagement with the bevel gear wheel 33, and carried by a horizontal shaft 35, arranged within the tubular member 7, and having operative engagement with the primary driving shaft 2, through a pair of bevel gear wheels 36, as shown.

37 designates a bracket head carried by a vertical post or standard 38 on the enlarged head 3 of the supporting column 1, and formed with forked overhanging arms for the pivotal attachment of the carrying arm 39 of the aforesaid cover 27 of the popping pan 24.

40 designates a vertically depending stem upon which the aforesaid pan cover 27 and convex web 28 are secured so as to be carried thereby. At its upper end the stem 40 is revolubly mounted in the free end of the aforesaid carrying arm 39, and the lower end of said stem 40, is adapted to have turning engagement in a central socket formed therefor in the upper end of the hub member 30 aforesaid, with a view to steadying the said stem and the cover members 27, 28, in their free rotation in actual use. With the described construction, the cover members 27, 28 and stem 40 have free rotation, and in addition have movement in a vertical plane along with the carrying arm 39 aforesaid. At its pivotal end, said carrying arm 39 is of a forked formation and has pivotal connection with the forked arms of the bracket head 37, by a transverse pivot shaft 41.

42 designates a toothed sector secured to the carrying arm 39 in concentric relation to the axis of the pivot shaft 41, and is adapted for intermittent operative engagement with a worm hub hereinafter described.

43 designates a vertical shaft arranged in spaced relation to the primary driving shaft 2 of the apparatus, and operatively connected thereto by a pair of gear wheels 44, the said shaft being preferably formed in two sections for the convenient assemblage of the parts carried by said shaft.

The auxiliary pinion 17 heretofore referred to, is splined or otherwise fixedly secured to the shaft 43 aforesaid, and has constant rotation therewith, while the companion primary bevel pinion 16 is mounted loosely on the shaft 43, so that said shaft may rotate independent of said pinion 16 during certain stages in the operation of the apparatus. Accordingly the sole function of the auxiliary pinion 17 is to assist in turning the bevel gear wheel 15, until one or the other of the mutilations or gaps 18 or 19 of said wheel 15 is reached and occupied by said auxiliary pinion 17, and thus insure a full semi-revolution of said bevel wheel 15 and its accessories.

45 designates a clutch sleeve or collar surrounding the shaft 43 and adapted to rotate therewith, while having limited independent vertical movement thereon through an intermediate sliding connection hereinafter described. The lower portion of the bore of said sleeve 45 is enlarged to receive a circular clutch rim 16' formed on the above mentioned bevel pinion 16, and said bore is provided with a vertical rib or ribs 46 adapted to engage in the clutch recess of the clutch rim 16' aforesaid, to lock the bevel gear 16 and clutch sleeve 45 together for simultaneous rotation. The aforesaid rib or ribs 46 are preferably in sliding engagement with a vertical rib or spline 47 on the vertical shaft 43, to insure positive rotation of the clutch sleeve 45 along with the shaft 43.

48 designates a sleeve fixedly secured to the shaft 43, with its lower end fitting the upper bore of the clutch sleeve 45, and forming an abutment for an intermediate spring 49, the tendency of which is to force the aforesaid sleeve 45 downward into clutching engagement with the bevel pinion 16, aforesaid.

50 and 51 designate top and bottom circular flanges on the clutch sleeve 45, adapted for holding engagement with the holding mechanisms hereinafter described.

52 designates the operating eccentric of the timing mechanism hereinafter described. Said eccentric is carried by a sleeve shaped hub 53 that turns freely on the shaft 43 and is locked thereto at certain periods in the operation of the mechanism now to be described.

54 designates a vertically moving locking bar having sliding movement in a vertical slide groove in the shaft 43 and having an out turned lower end 55, moving in a vertically elongated slot in the abutment sleeve 48, and fixedly connected to the clutch sleeve 45, as illustrated more particularly in Fig. 8. Said locking bar 54, is also formed with an out-turned upper end 56, adapted for clutching engagement with a clutch tooth 57 on the eccentric sleeve 53 when the clutch sleeve 45 is in a lowered position. With said clutch sleeve 45 in its fully raised position the aforesaid end 56 of the locking bar is out of clutching engagement with the clutch tooth 57, and no rotary movement is communicated from the shaft 43 to the eccentric 52 during such position of the said clutch sleeve 45.

58 and 59 designate a primary cam wing and a secondary cam wing carried on the perimeter of the bevel gear wheel 15, in a diametrically opposed relation, and adapted for operative engagement with the aforesaid clutch sleeve 45 to lift the same vertically into the two raised positions hereinafter described and in which positions the said clutch sleeve 45 is held by the two sets of holding means hereinafter described, and to such end the secondary cam wing 59 will have a greater lift than the companion primary cam wing 58.

The primary holding means above referred to, comprises an automatically operating mechanism as follows:—60 designates a horizontally swinging toe, adapted to move beneath the aforesaid circular top flange 50 of the clutch sleeve 45 to hold said clutch sleeve in its fully raised condition, and in which no movement is imparted to the timing mechanism of the apparatus, owing to the fact that the upper end 56 of the locking bar 54 is raised out of operative engagement with the clutch tooth 57 of the operating eccentric 52 of such timing mechanism.

61 designates a vertical pivot stem carrying the aforesaid holding toe 60, and having journal bearing in the bracket head 37, with the upper end of said stem associated with a torsion spring 62, the tendency of which is to force the toe 60 beneath the flange 50 above referred to.

63 designates a worm hub turning with the shaft 43 and capable of independent vertical movement thereon by means of a pin 64 on said hub moving in a vertical groove in the shaft 43, as shown more particularly in Fig. 8. The worm or screw-thread on the exterior of the hub 63, is out of operative engagement with the teeth of the sector 42, aforesaid, when the popping pan cover 27, is closed, and said operative engagement is automatically effected, as the said cover is partly raised by the expansion of the popped corn within the popping pan 24. With the operative engagement of the parts thus established, the worm hub 63 acts upon the toothed sector 42, to raise the pan cover 27 from the partly open condition shown in full lines in Fig. 3, to the fully open condition shown in dotted lines in Fig. 3, and in full lines in Fig. 4.

65 designates a superimposed spring, against the resiliency of which the upward movement of the worm hub 63 takes place in the operation of manually closing the cover 27 of the apparatus in the beginning of the operation of the same upon a batch of raw corn.

66 designates a cam hub turning in unison with the toothed sector 42 aforesaid, and having a spiral cam groove adapted for operative engagement with a lateral pin 67 on the pivot stem 61 of the holding toe 60, and the arrangement is such that as the cover 27 is moving to its fully open position, the cam groove of the hub 66 will impart a turning movement to the pin 67, pivot stem 61 and holding toe 60, to release said toe from its holding engagement with the upper holding flange 50 of the clutch sleeve 45, to permit the same to partially descend into holding engagement with the hereinafter described secondary holding means. The amount of the above mentioned descent of the clutch sleeve 45, brings the upper end 56 of the locking bar 54 into operative engagement with the clutch tooth 57, to impart rotary movement from the shaft 43 to the operating eccentric 52 of the timing mechanism before referred to.

In the construction shown, the pin 67 above referred to, is pivoted to the stem 61, as shown in Fig. 17, in order that it may ride over the cam hub 66, when a reverse movement is imparted to said hub in the closing of the cover 27 of the popping pan, by hand, in the beginning of a succeeding operation of the mechanism.

The secondary holding means before referred to comprises an assemblage of parts as follows:—68 designates a pivoted holding dog adapted to engage beneath the bottom flange 51 of the clutch sleeve 45, to hold the same in a position in which the timing mechanism will be in active operation, and the bevel pinion 16 will be out of operative engagement with the shaft 43. Said holding dog 68 is preferably provided with a thumb piece or extension 69 for the manual actuation by the operator, when so required in the continued use of the apparatus.

70 designates a trip lever, one arm of which has operative engagement with the holding dog 68 aforesaid, while the other arm extends into the path of a plurality of operating studs of the timing mechanism now to be described.

71 designates a ratchet disk journaled on the extension 38 of the main column 1, and adapted to receive a step by step rotation from a dog or pawl forming a part of the pivoted yoke 72 of the operating eccentric 52, aforesaid, and as illustrated more particularly in Figs. 14 and 15.

73 and 74 designate a pair of operating studs disposed in circular spaced relation on the side of the ratchet disk 71 and adapted in the progressive rotation of said disk, to successively operate the trip lever 70, to in turn release the holding dog 68 from its holding engagement beneath the lower flange 51 of the clutch sleeve 45, to permit the same to descend and have operative engagement with the bevel pinion 16 and impart the required intermittent semi-revolutions to the popping pan 24, and its accessories in manner set forth in the operation of the apparatus.

75 designates a torsion spring disposed between the arm 39 of the pan cover 27, and the bracket 37, to form a balance for the pan cover in its opening and closing movements.

The operation of the apparatus is as follows: The operator having placed a charge of raw corn in the popping pan 24, moves the pan cover 27 down into a closed position, and in doing so disengages the toothed sector from operative engagement with its operating worm hub 63. As said charge of raw corn, under the influence of the heat of the burner 6, begins to pop, its consequent increase in bulk will cause the mass of corn to rise against the cover 27 and effect a partial opening of the same and move the toothed sector 42 into operative engagement with the worm hub 63 to in turn effect a fully open condition of said cover 27. In the above mentioned opening movement of the cover 27, the cam hub 66 in its turning movement along with said cover, actuates the primary holding mechanism 60, 61, 62, to release the clutch sleeve 45 and permit the same to descend onto the holding dog 68 of the secondary holding mechanism. In such descent the upper end 56 of the locking bar 54 is brought into operative engagement with the clutch tooth 57 of the operating eccentric 52 of the timing mechanism. The rotation of the eccentric 52 now begins and imparts a progressive step by step rotation to the ratchet disk 71 and in time brings the primary stud 73 into operative engagement with the trip lever 70, to actuate the same and release the holding dog 68 from engagement beneath the lower flange 51 of the clutch sleeve 45 and permit the same to move down into its lower position. In such downward movement of the clutch sleeve 45, through its rib or ribs 47, engages the clutch rim 16' of the bevel pinion 16 to cause the same to revolve with the operating shaft 43, and said pinion now operates to impart a semi-revolution to the bevel gear wheel 15, and to the popping pan 24, fuel gas burner 6 and other accessories which are operatively connected with said bevel gear wheel 15. With such semi-revolution of the parts, the popping pan 24, etc., are in an inverted position and remain in such position for a period of time to permit the discharge of the remaining contents of the popping pan.

The full semi-revolution of the above mentioned parts is controlled, and more than a semi-revolution prevented, by the action of the primary cam ring 58 on the bevel gear wheel 15, acting against the lower flange 51 of the clutch sleeve 45, to raise such clutch sleeve out of clutching engagement with the bevel pinion 16, by which the rotation of the bevel gear wheel 15 is effected, and the parts are held in such disengaged condition by a reëngagement of the dog 68 beneath the aforesaid lower flange 51 of the clutch sleeve 45. In this connection the auxiliary pinion 17, having constant rotation with the operating shaft 43, acts to effect any remaining portion of the above described semi-revolution of the parts, before said auxiliary pinion 17 moves into the mutilation or gap 18 of the bevel gear wheel 15.

The timing mechanism in its continued operation brings the secondary stud 74 into operative engagement with the trip lever 70 to actuate the same and again release the holding dog 68 from engagement beneath the lower flange 51 of the clutch sleeve 45 and permit said sleeve to reëngage the bevel pinion 16 and cause a revolution of the same in a positive manner, and effect a succeeding semi-revolution of the bevel gear wheel 15, popping pan 24, and other parts which are operatively connected with said bevel gear wheel 15. With such succeeding semi-revolution of the parts, the popping pan 24, is in its original righted position, and the full semi-revolution is controlled, and more than a semi-revolution prevented by the action of the secondary cam wing 59, on the bevel gear wheel 15, acting against the lower flange 51 of the clutch sleeve 45, to raise the same out of clutching engagement with the bevel pinion 16, and into a fully raised condition, in which it is held by the engagement of the holding toe 60, of the primary holding mechanism, beneath the upper flange 50 of the clutch sleeve 45. Such fully raised condition or lift of the clutch sleeve 45, is due to the greater size of the secondary cam wing 59, and in addition to unclutching said sleeve from the bevel pinion 6, the further action is to disengage the upper end 56 of the locking bar 54 from the clutch tooth 57 of the operating eccentric 52, and render the timing mechanism dormant.

In connection with the operation of the bevel pinion 16 in imparting the second semi-revolution above described to the bevel gear wheel 15, popping pan 24 and associated parts, the aforesaid auxiliary pinion 17 acts to effect any remaining portion of said semi-revolution before said pinion 17 moves into the mutilation or gap 19 of the bevel gear wheel 15. The mechanism is now in the condition first described in the operation of the parts, and ready to receive a fresh charge of raw corn, so that with a closure of the cover 27, a recommencement of of the operations above described will take place.

Having thus fully described my said invention what I claim as new and desire to secure by Letters Patent, is:—

1. In a corn popping apparatus, a revolubly mounted popping pan and heating accessories, means for imparting intermittent semi-revolutions to the same, and a timing mechanism controlling said means, substantially as set forth.

2. In a corn popping apparatus, a revolubly mounted popping pan and heating accessories, means for imparting intermittent semi-revolutions to the same, a timing mechanism controlling said means and comprising an operating eccentric, a clutch mechanism associated with said eccentric, a pawl carrying yoke associated with said eccentric, a ratchet disk receiving step by step rotations from said yoke and provided with a pair of circularly spaced studs, and a clutch mechanism associated with the means for imparting semi-revolutions to the popping pan and adapted for operation by the studs aforesaid, substantially as set forth.

3. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, means moving with said gear wheel for shifting said clutch sleeve into an unclutched condition, means for holding said sleeve in its unclutched condition, and a timing mechanism operated by the driving shaft and controlling the holding means aforesaid, substantially as set forth.

4. In a corn popping apparatus, a revolubly mounted popping pan and heating accessories, a gear wheel associated with said popping pan and having a continuous toothed portion and a gapped or mutilated toothed portion, a driving shaft, a primary pinion associated with the continuous toothed portion of the gear wheel, an auxiliary pinion associated with the mutilated toothed portion of said gear wheel and fixedly connected to the driving shaft, a clutch sleeve associated with the primary pinion and driving shaft, means moving with said gear wheel for shifting said clutch sleeve into an unclutched condition, means for holding said sleeve in its unclutched condition, and a timing mechanism operated by the driving shaft and controlling the holding means aforesaid, substantially as set forth.

5. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, cam wings moving with the gear wheel and adapted to move the clutch sleeve into an unclutched condition, means for holding said sleeve in its unclutched condition, and a timing mechanism operated by the driving shaft and controlling the holding means aforesaid, substantially as set forth.

6. In a corn popping apparatus, a revolubly mounted popping pan and heating accessories, a gear wheel associated with said popping pan and having a continuous toothed portion and a gapped or mutilated toothed portion, a driving shaft, a primary pinion associated with the continuous toothed portion of the gear wheel, an auxiliary pinion associated with the mutilated toothed portion of said gear wheel and fixedly connected to the driving shaft, a clutch sleeve associated with the primary pinion and driving shaft, cam wings moving with the gear wheel and adapted to move the clutch sleeve into an unclutched condition, means for holding said sleeve in its unclutched condition, and a timing mechanism operated by the driving shaft and controlling the holding means aforesaid, substantially as set forth.

7. In a corn popping apparatus, a revolubly mounted popping pan and heating accessories, a gear wheel associated with said popping pan, a driving shaft, a pinion associcited with the gear wheel and driving shaft aforesaid, a clutch sleeve associated with said pinion and driving shaft, means moving with said gear wheel for shifting said clutch sleeve into an unclutched condition, means for holding said sleeve in its unclutched condition, a timing mechanism operated by the driving shaft and controlling the holding means aforesaid, and resilient friction means for retarding the turning movement of the gear wheel aforesaid, substantially as set forth.

8. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, means moving with said gear wheel for shifting said clutch sleeve into an unclutched condition, a primary holding means for holding said sleeve in an unclutched condition, a timing mechanism for operating said primary holding means, clutching means associated with the aforesaid clutch sleeve and the operating member of the timing mechanism, and a secondary holding means for holding said clutch sleeve and clutching means in an unclutched condition, substantially as set forth.

9. In a corn popping apparatus, a revolubly mounted popping pan and heating accessories, a gear wheel associated with said popping pan and having a continuous toothed portion and a gapped or mutilated toothed portion, a driving shaft, a primary pinion associated with the continuous toothed portion of the gear wheel, an auxiliary pinion associated with the mutilated toothed portion of said gear wheel and fixedly connected to the driving shaft, a clutch sleeve associated with the primary pinion and driving shaft, means moving with said gear wheel for shifting said clutch sleeve into an unclutched condition, a primary holding means for holding said sleeve in an unclutched condition, a timing mechanism for operating said primary holding means, clutching means associated with the aforesaid clutch sleeve and the operating member of the timing mechanism, and a secondary holding means for holding said clutch sleeve and clutching means in an unclutched condition, substantially as set forth.

10. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, cam wings moving with the gear wheel and adapted to move the clutch sleeve into an unclutched condition, a primary holding means for holding said sleeve in an unclutched condition, a timing mechanism for operating said primary holding means, clutching means associated with the aforesaid clutch sleeve and the operating member of the timing mechanism, and a secondary holding means for holding said clutch sleeve and clutching means in an unclutched condition, substantially as set forth.

11. In a corn popping apparatus, a revolubly mounted popping pan and heating accessories, a gear wheel associated with said popping pan and having a continuous toothed portion and a gapped or mutilated toothed portion, a driving shaft, a primary pinion associated with the continuous toothed portion of the gear wheel, an auxiliary pinion associated with the mutilated toothed portion of said gear wheel and fixedly connected to the driving shaft, a clutch sleeve associated with the primary pinion and driving shaft, cam wings moving with the gear wheel and adapted to move the clutch sleeve in an unclutched condition, a primary means for holding said sleeve in an unclutched condition, a timing mechanism for operating said primary holding means, clutching means associated with the aforesaid clutch sleeve and the operating member of the timing mechanism, and a secondary holding means for holding said clutch sleeve and clutching means in an unclutched condition, substantially as set forth.

12. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, means moving with said gear wheel for shifting said clutch sleeve into an unclutched condition, a primary holding means for holding said sleeve in an unclutched condition, a timing mechanism for operating said primary holding means, clutching means associated with the aforesaid clutch sleeve and the operating member of the timing mechanism, the same comprising a locking bar moving in a groove in the driving shaft and connected one end with the clutch sleeve aforesaid, with its other end adapted for clutching engagement with the operating member of the timing mechanism, and a secondary holding means for holding said clutching sleeve and a locking bar in an unclutched condition, substantially as set forth.

13. In a corn popping apparatus, a revolubly mounted popping pan and heating accessories, means for imparting intermittent semi-revolutions to the same, a timing mechanism controlling said means, and a movable cover for said pan controlling said timing mechanism, substantially as set forth.

14. In a corn popping apparatus, a revolubly mounted popping pan and heating accessories, means for imparting intermittent semi-revolutions to the same, a timing mechanism controlling said means and comprising an operating eccentric, a clutch mechanism associated with said eccentric, a pawl carrying yoke associated with said eccentric, a ratchet disk receiving step by step rotation from said yoke and provided with a pair of circularly spaced studs, a clutch mechanism associated with the means for imparting semi-revolutions to the popping pan and adapted for operation by the aforesaid studs, and a movable cover for said pan controlling said timing mechanism, substantially as set forth.

15. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, means moving with said gear wheel for shifting said clutch sleeve into an unclutched condition, means for holding said sleeve in its unclutched condition, a timing mechanism operated by the driving shaft and controlling the holding means aforesaid and a movable cover for said pan controlling said timing mechanism, substantially as set forth.

16. In a corn popping apparatus, a revolubly mounted popping pan and heating accessories, a gear wheel associated with said popping pan and having a continuous toothed portion and a gapped or mutilated toothed portion, a driving shaft, a primary pinion associated with the continuous toothed portion of the gear wheel, an auxiliary pinion associated with the mutilated toothed portion of said gear wheel and fixedly connected to the driving shaft, a clutch sleeve associated with the primary pinion and driving shaft, means moving with said gear wheel for shifting said clutch sleeve into an unclutched condition, means for holding said sleeve in its unclutched condition, a timing mechanism operated by the driving shaft and controlling the holding means aforesaid, and a movable cover for said pan controlling the timing mechanism, substantially as set forth.

17. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, cam wings moving with the gear wheel and adapted to move the clutch sleeve into an unclutched condition, means for holding said sleeve in its unclutched condition, a timing mechanism operated by the driving shaft and controlling the holding means aforesaid, and a movable cover for said pan controlling said timing mechanism, substantially as set forth.

18. In a corn popping apparatus, a revolubly mounted popping pan and heating accessories, a gear wheel associated with said popping pan and having a continuous toothed portion and a gapped or mutilated toothed portion, a driving shaft, a primary pinion associated with the continuous toothed portion of the gear wheel, an auxiliary pinion associated with the mutilated toothed portion of said gear wheel and fixedly connected to the driving shaft, a clutch sleeve associated with the primary pinion and driving shaft, cam wings moving with the gear wheel and adapted to move the clutch sleeve into an unclutched condition, means for holding said sleeve in its unclutched condition, a timing mechanism operated by the driving shaft and controlling the holding means aforesaid, and a movable cover for said pan controlling said timing mechanism, substantially as set forth.

19. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, means moving with said gear wheel for shifting said clutch sleeve into an unclutched condition, means for holding said sleeve in its unclutched condition, a timing mechanism operated by the driving shaft and controlling the holding means aforesaid, resilient friction means for retarding the turning movement of the gear wheel aforesaid, and a movable cover for said pan controlling said timing mechanism, substantially as set forth.

20. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, means moving with said gear wheel for shifting said clutch sleeve into an unclutched condition, a primary holding means for holding said sleeve in an unclutched condition, a timing mechanism for operating said primary holding means, clutching means associated with the aforesaid clutch sleeve and the operating member of the timing mechanism, a secondary holding means for holding said clutch sleeve and clutching means in an unclutched condition, and a movable cover for said pan controlling the timing mechanism, substantially as set forth.

21. In a corn popping apparatus, a revolubly mounted popping pan and heating accessories, a gear wheel associated with said popping pan and having a continuous toothed portion and a gapped or mutilated toothed portion, a driving shaft, a primary pinion associated with the continuous toothed portion of the gear wheel, an auxiliary pinion associated with the mutilated toothed portion of said gear wheel and fixedly connected to the driving shaft, a clutch sleeve associated with the primary pinion and driving shaft, means moving with said gear wheel for shifting said clutch sleeve into an unclutched condition, a primary holding means for holding said sleeve in an unclutched condition, a timing mechanism for operating said primary holding means, clutching means associated with the aforesaid clutch sleeve and the operating member of the timing mechanism, a secondary holding means for holding said clutch sleeve and clutching means in an unclutched condition, and a movable cover for said pan controlling the timing mechanism, substantially as set forth.

22. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, cam wings moving with the gear wheel and adapted to move the clutch sleeve into an unclutched condition, a primary holding means for holding said sleeve in an unclutched condition, a timing mechanism for operating said primary holding means, clutching means associated with the aforesaid clutch sleeve and the operating member of the timing mechanism, a secondary holding means for holding said clutch sleeve and clutching means in an unclutched condition, and a movable cover for said pan controlling the timing mechanism, substantially as set forth.

23. In a corn popping apparatus, a revolubly mounted popping pan and heating accessories, a gear wheel associated with said popping pan and having a continuous toothed portion and a gapped or mutilated toothed portion, a driving shaft, a primary pinion associated with the continuous toothed portion of the gear wheel, an auxiliary pinion associated with the mutilated toothed portion of said gear wheel and fixedly connected to the driving shaft, a clutch sleeve associated with the primary pinion and driving shaft, cam wings moving with the gear wheel and adapted to move the clutch sleeve in an unclutched condition, a primary means for holding said sleeve in an unclutched condition, a timing mechanism for operating said primary holding means, clutching means associated with the aforesaid clutch sleeve and the operating member of the timing mechanism, a secondary holding means for holding said clutch sleeve and clutching means in an unclutched condition, and a movable cover for said pan controlling the timing mechanism, substantially as set forth.

24. In a corn popping apparatus, a revolubly mounted popping pan and heating accessories, a gear wheel associated with said popping pan, a driving shaft, a pinion associated with the gear wheel and driving shaft aforesaid, a clutch sleeve associated with said pinion and driving shaft, means moving with said gear wheel for shifting said clutch sleeve into an unclutched condition, a primary holding means for holding said sleeve in an unclutched condition, a timing mechanism for operating said primary holding means, clutching means associated with the aforesaid clutch sleeve and the operating member of the timing mechanism, the same comprising a locking bar moving in a groove in the driving shaft and connected at one end with the clutch sleeve aforesaid, with its other end adapted for clutching engagement with the operating member of the timing mechanism, a secondary holding means for holding said clutch sleeve and locking bar in an unclutched condition and a movable cover for said pan controlling the timing mechanism, substantially as set forth.

Signed at Chicago, Illinois, this 17th day of August, 1915.

CHARLES CRETORS.

Copies of this patent may be obtained for five cents each, by addressing the "Commissioner of Patents, Washington, D. C."